(12) United States Patent
Shalosky

(10) Patent No.: US 6,513,241 B1
(45) Date of Patent: Feb. 4, 2003

(54) METHOD AND APPARATUS FOR PRODUCING A VEHICLE WHEEL

(75) Inventor: Matthew D. Shalosky, Dixon, TN (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/707,232

(22) Filed: Nov. 6, 2000

(51) Int. Cl.$^7$ ................................................. B23P 17/00
(52) U.S. Cl. ....................... 29/894.322; 29/525; 29/802
(58) Field of Search ....................... 28/894.32, 894.322, 28/802, 525

(56) References Cited

U.S. PATENT DOCUMENTS

| | | | |
|---|---|---|---|
| 5,029,385 A | | 7/1991 | Daniels ........................ 29/802 |
| 6,357,116 B1 | * | 3/2002 | Waelchli et al. ....... 29/894.322 |

* cited by examiner

Primary Examiner—P. W. Echols
(74) Attorney, Agent, or Firm—MacMillan, Sobanski & Todd, LLC

(57) ABSTRACT

A method for assembling a rim and a disc together to produce a wheel comprising the steps of: (a) providing a rim including an inboard tire bead seat retaining flange, an inboard tire bead seat, a well portion, an outboard tire bead seat, and an outboard tire bead seat retaining flange, the outboard tire bead seat retaining flange including a first inner surface, the outboard tire bead seat including a second inner surface, the well portion including a third inner surface, a fourth inner surface, a fifth inner surface, and a sixth inner surface, the inboard tire bead seat retaining flange including a seventh inner surface; (b) providing a disc having a generally centrally located inner wheel mounting portion and an outer annular portion which terminates in an outer annular flange including an endmost surface; (c) supporting the rim between at least a portion of the third inner surface and at least a portion of one of the fifth and seventh inner surfaces; (d) supporting the disc between the inboard mounting surface and the outboard mounting surface; (e) selectively moving at least one of the rim and the disc toward one another to cause the outer annular disc flange to engage the wheel rim fourth inner surface in a press fit engagement therewith; and (f) subsequent to step (e), welding the disc to the rim to thereby permanently join the rim and disc together and produce the vehicle wheel.

11 Claims, 7 Drawing Sheets

METHOD AND APPARATUS FOR PRODUCING A VEHICLE WHEEL

BACKGROUND OF THE INVENTION

This invention relates in general to vehicle wheels and in particular to an improved method and apparatus for producing a vehicle wheel.

A conventional vehicle wheel is typically of a two-piece construction and includes an inner wheel disc and an outer "full" wheel rim. The wheel disc can be cast, forged, or fabricated from steel, aluminum, or other alloys, and includes an inner annular wheel mounting portion and an outer annular portion. The wheel mounting portion of the wheel disc defines an inboard mounting surface and includes a center pilot or hub hole, and a plurality of lug receiving holes formed therethrough for mounting the vehicle wheel to an axle of the vehicle. The wheel rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the wheel disc is used. In both types of constructions, the outer annular portion of the wheel disc is secured to the wheel rim by welding.

In the above vehicle wheel constructions, after the wheel disc and the wheel rim have been assembled and welded together several finishing operations may be required to produce a wheel having the desired specifications. First, at least one of the inboard and outboard tire bead seats and/or at least one of the inboard and outboard tire bead seat retaining flanges may have to be generally be processed so that the tire bead seats are oriented and located concentric with the wheel axis (commonly referred to as "radial runout"), and the tire bead seat retaining flanges are oriented in a parallel relationship relative to an inboard mounting surface of the wheel disc (commonly referred to as "lateral" or "axial" runout). Following this, the location of center pilot hole, the lug receiving holes, or both may have to be corrected by an appropriate method, such as reboring the center pilot hole and repunching the lug receiving holes, so that an axis of the center pilot hole is oriented in a concentric relationship relative to the wheel axis and the tire bead seats and the axes of the lug receiving holes are oriented parallel to the wheel axis.

One example of a prior art wheel assembly tooling apparatus is disclosed in U.S. Pat. No. 5,029,385 to Daniels. As disclosed in the Daniels patent, the prior art wheel assembly tooling apparatus is effective to force fit a wheel disc within a wheel rim. The prior art wheel assembly tooling apparatus accomplishes this by fixedly locating the wheel rim, fixing the relationship of a center portion and flange portions of the wheel disc to each other, and applying a uniform force to such portions of the wheel disc to force fit the flange portions within the drop center flange of the wheel rim while maintaining the center portion of the wheel disc in a plane parallel to a plane of the terminal flange of the wheel rim. As a result of this, the vehicle wheel is provided with minimum lateral runout.

SUMMARY OF THE INVENTION

This invention relates to an apparatus and method for assembling a wheel rim and a wheel disc together to produce a vehicle wheel The method comprises the steps of: (a) providing a wheel rim defining an axis and including an inboard tire bead seat retaining flange, an inboard tire bead seat, a well portion, an outboard tire bead seat, and an outboard tire bead seat retaining flange, the outboard tire bead seat retaining flange including a generally radially extending first inner surface, the outboard tire bead seat including a generally axially extending second inner surface, the well portion including a generally radially extending third inner surface adjacent the second inner surface, a generally axially extending fourth inner surface, a generally radially extending fifth inner surface, and a generally axially extending sixth inner surface, the third through the sixth inner surfaces of the well portion extending in succession from the outboard tire bead seat to the inboard tire bead seat, the inboard tire bead seat retaining flange including a generally radially extending seventh inner surface; (b) providing a wheel disc having a generally centrally located inner wheel mounting portion and an outer annular portion which terminates in a generally axially extending outer annular flange including an endmost surface, the inner wheel mounting portion including an inboard mounting surface and an outboard mounting surface; (c) supporting the wheel rim between at least a portion of the third inner surface and at least a portion of one of the fifth inner surface and the seventh inner surface; (d) supporting the wheel disc between the inboard mounting surface and the outboard mounting surface of the inner wheel mounting portion; (e) selectively moving at least one of the wheel rim and the wheel disc toward one another to cause the outer annular flange of the wheel disc to engage the fourth inner surface of the wheel rim in a press fit engagement therewith while supporting the wheel rim and the wheel disc as recited in steps (c) and (d), the wheel rim and the wheel disc being selectively moved to produce a desired lateral runout dimension defined between the inboard mounting surface of the wheel disc and the seventh inner surface of the inboard tire bead seat retaining flange of the wheel rim; and (f) subsequent to step (e), welding the wheel disc to the wheel rim to thereby permanently join the wheel rim and the wheel disc together and produce the vehicle wheel.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
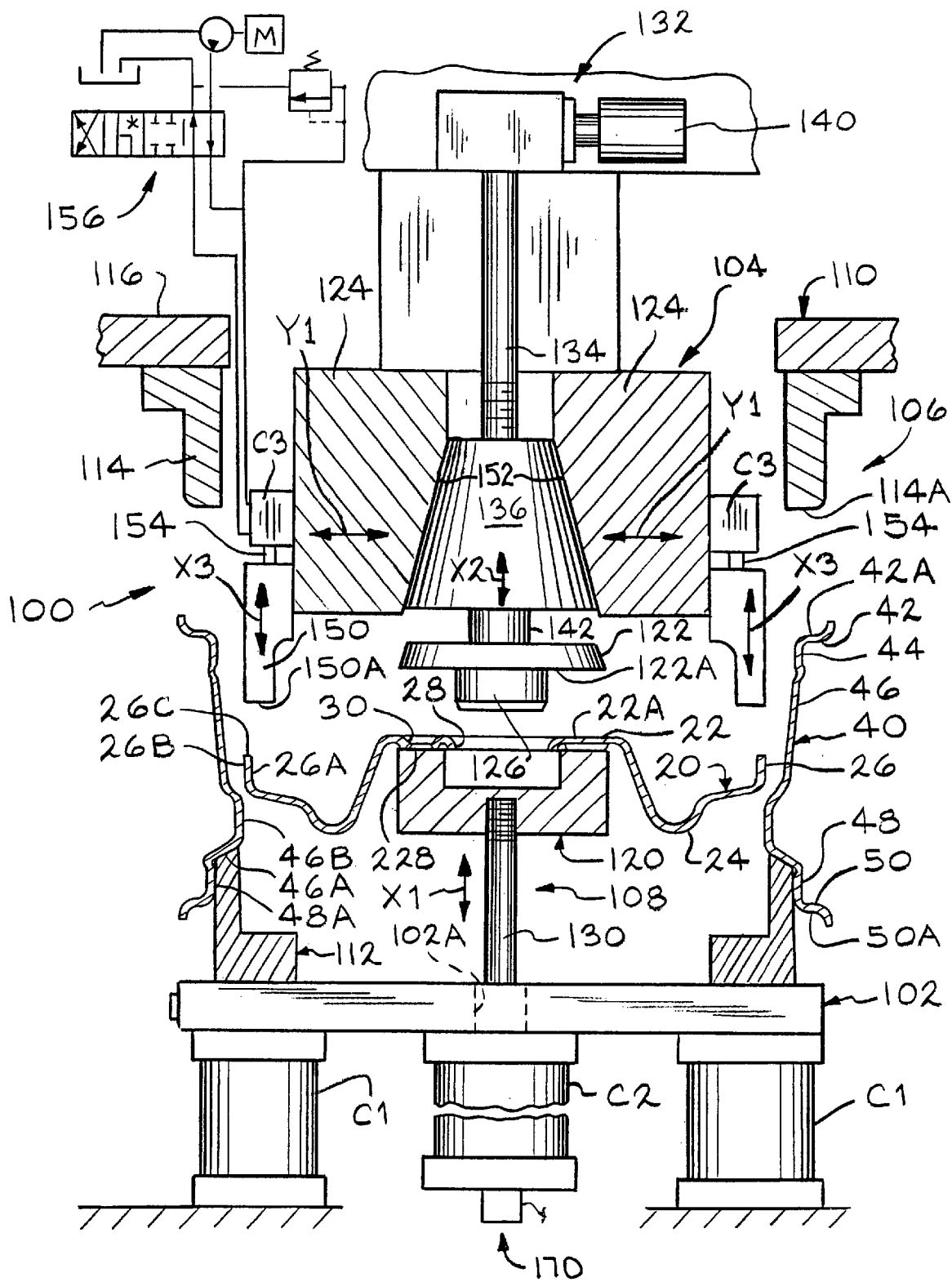
FIG. 1 is a partial sectional view of a first embodiment of a wheel assembly tooling apparatus according to this invention, with the wheel assembly tooling apparatus being shown in the initial position of the assembly process in accordance with the present invention.
Figure 6:
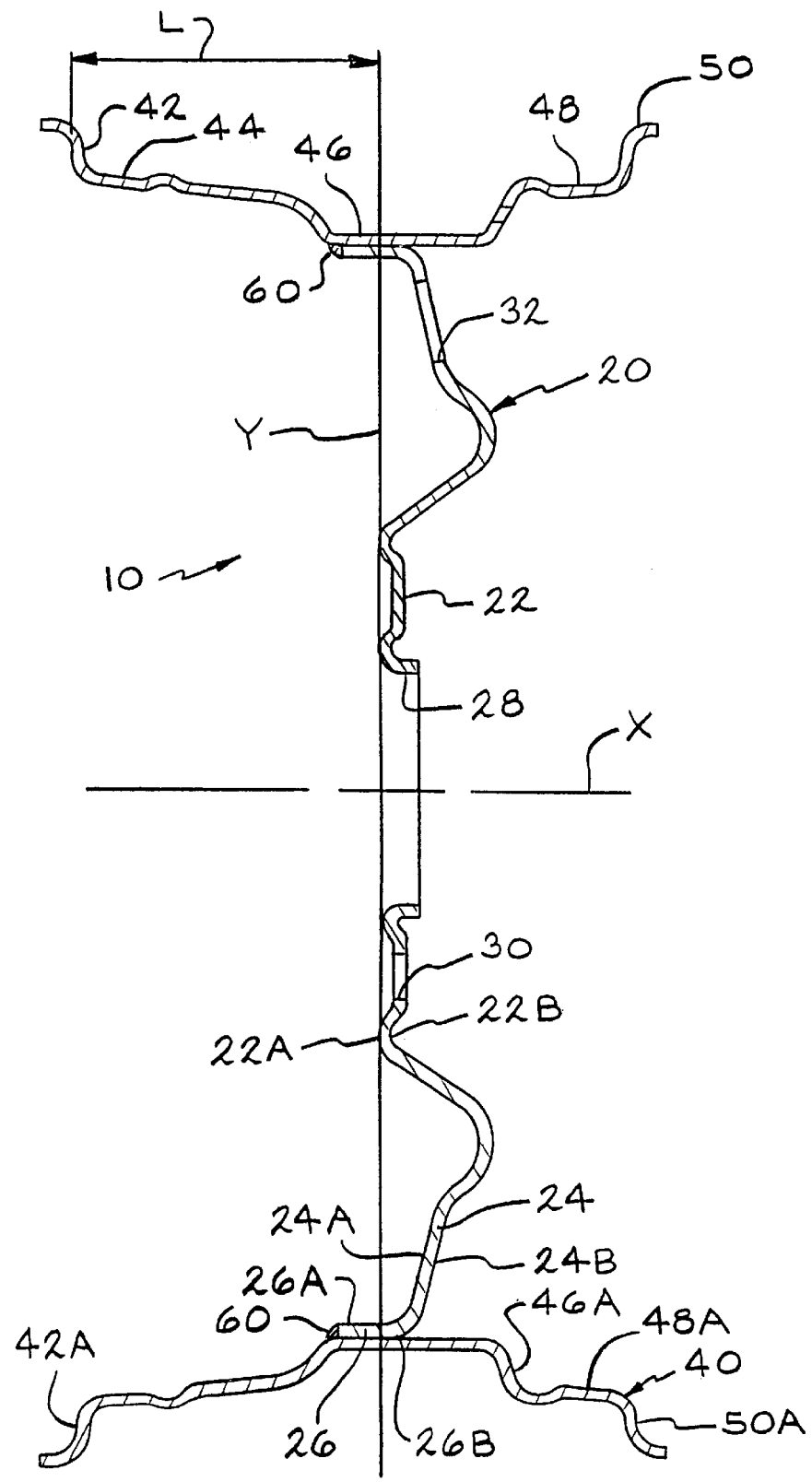
FIG. 6 is a sectional view of a vehicle wheel constructed in accordance with the present invention.

Referring now to the drawings, there is illustrated in FIG. 1 a wheel assembly tooling apparatus, indicated generally at 100, for producing a vehicle wheel, indicated generally at 10 in FIG. 6, in accordance with this invention. As shown in FIG. 6, the vehicle wheel 10 is illustrated as being a "well attached" vehicle wheel, and includes a wheel disc 20 and a wheel rim 40 which are joined together by a weld 60 and which define a generally horizontal vehicle wheel axis X. Although the present invention is illustrated and described in conjunction with the particular vehicle wheel construction disclosed herein, it will be appreciated that the invention can be used in conjunction with other types of vehicle wheel constructions. For example, the vehicle wheel can be a "bead seat attached" vehicle wheel, similar to that shown in FIG. 4 of U.S. Pat. No. 5,188,429 to Heck et al. or FIG. 30 of U.S. Pat. No. 5,694,687 to Coleman, or a "bimetal" vehicle wheel construction, similar to that shown in U.S. Pat. No. 5,421,642 to Wei et al., the disclosures of the Heck et al., Coleman, and Wei et al. patents incorporated herein by reference.

As best shown in FIG. 6, the wheel disc 20 is forged, cast, fabricated, or otherwise formed from a suitable material, such as for example, steel, magnesium, titanium, aluminum or other alloys materials. The wheel disc 20 includes a generally centrally located inner wheel mounting portion 22, and an outer annular portion 24 which terminates in a generally axially extending outer annular flange 26. The wheel mounting portion 22 is provided with a centrally located pilot aperture 28, and a plurality of lug bolt receiving holes 30 (only one lug bolt receiving holed 30 is illustrated in FIG. 6), spaced equidistantly from the pilot aperture 28. The lug bolt receiving holes 30 are adapted to receive lug bolts and nuts (not shown) for securing the vehicle wheel 10 on a stationary component (not shown) of a vehicle, such as an axle. The wheel mounting portion 22 of the wheel disc 20 further includes an inboard wheel mounting surface 22A which defines a vertical axis Y which is generally perpendicular to the vehicle wheel axis X, and an outboard wheel mounting surface 22B.

In the illustrated embodiment, the outer annular portion 24 of the wheel disc 20 is provided with a plurality of decorative windows or openings 32 provided therein (only one of such decorative windows 32 illustrated in FIG. 6). The outer annular portion 24 of the wheel disc 20 further includes an inboard surface 24A and an outboard surface 24B. The outer annular flange 26 of the wheel disc 20 includes an inner axially extending cylindrical surface 26A and an outer axially extending cylindrical surface 26B which is substantially parallel to the outer cylindrical surface 26A so as to define a generally constant thickness throughout the entire length of the outer annular flange 26 of the wheel disc 20. The outer annular flange 26 of the wheel disc 20 terminates at a generally radially extending end surface 26C which defines an axial endmost surface.

The wheel rim 40 is a fabricated rim constructed of steel, magnesium, titanium, aluminum, or other alloy materials. The wheel rim 40 includes an inboard tire bead seat retaining flange 42, an inboard tire bead seat 44, a generally axially extending well 46, an outboard tire bead seat 48, and an outboard tire bead seat retaining flange 50. The inboard tire bead seat retaining flange 42 includes a generally radially extending inboard surface 42A, and a section of the well 46 includes a generally radially extending inboard surface 46A, and a section of the well includes a generally axially extending surface 46B. The outboard tire bead seat 48 includes a generally axially extending inboard surface 48A, and the outboard tire bead seat retaining flange 50 includes an inboard surface 50A.

To assemble the wheel disc 20 and the wheel rim 40 to produce the vehicle wheel 10 of the present invention, the press fit wheel assembly tooling apparatus 100 of the present invention is used. As will be discussed below, the wheel press fit tooling apparatus 100 of the present invention includes a plurality tooling members which are moveable between an intermediate working or initial actuated position, shown in FIG. 1, and a final working or final actuated position, shown in FIG. 4, wherein the associated tooling members thereof are operative to support the wheel rim 40 at or near the opposed ends thereof and to support the wheel disc at the outer annular flange 26 thereof prior to or concurrently with the assembling of the wheel disc 20 and the wheel rim 40.

Referring now to FIGS. 1–5, the vehicle wheel assembly press fit tooling apparatus 100 and the method for producing the vehicle wheel 10 in accordance with the present invention will be discussed. As shown in FIG. 1, the wheel assembly tooling apparatus 100 includes a press bed 102, a press ram, indicated generally at 104, a wheel rim tooling support station, indicated generally at 106, and a wheel disc tooling support station, indicated generally at 108.

The wheel rim tooling support station 106 includes an upper wheel rim support tooling member 110 and a lower wheel rim support tooling member 112. In the illustrated embodiment, the upper wheel rim support tooling member 110 is fixed, and the lower wheel rim support tooling member 112 is moveably supported on the press bed 102. The press bed 102, and therefore the lower wheel rim support tooling member 112, is selectively moveable by a pair of associated wheel rim lift cylinders C1. The cylinders C1 are actuated by suitable means, such as by hydraulic, pneumatic, or other suitable means.

In the illustrated embodiment, the upper wheel rim support tooling member 110 includes a pair of upper support tooling members 114 and 116 which are connected together by a suitable means (such as for example, by a plurality of bolts (not shown). The tooling members 114 and 116 are preferably uninterrupted continuous annular tooling members. As a result, as will be discussed below, the tooling member 114 of the upper wheel rim support tooling member 110 is effective to engage and support the generally radially extending inboard surface 42A of the inboard tire bead seat retaining flange 42 of the wheel rim 40 around the entire periphery thereof.

In the illustrated embodiment, the lower wheel rim support tooling member 112 is a unitary tooling member and is secured to the press bed 102 by a suitable means, such as for example, by a plurality of bolts (not shown). The tooling member 112 is preferably an uninterrupted continuous annular tooling member. As a result, as will be discussed below, the lower wheel rim support tooling member 112 is effective to engage and support the generally radially outwardly extending inboard surface 46A of a section of the well 46 of the wheel rim 40 around the entire periphery thereof. Also, there may be some contact between the tooling member 112 and a generally axially extending inboard surface 48A of the outboard tire bead seat 48 of the wheel rim 40. In addition, the lower wheel rim support tooling member 112 is preferably provided with a locating member (not shown) which is adapted to extend through a valve stem opening (not shown) provided in the wheel rim 40 for locating purposes. Alternatively, the structure of the upper wheel rim support tooling member 110 and/or the lower wheel rim support tooling member 112 can be other than illustrated and described if desired. For example, the upper wheel rim support tooling member 110 and/or the lower wheel rim support tooling member 112 can include segmented tooling member(s) (i.e., not an uninterrupted continuous tooling member(s), so as not to provide full (i.e., 360 degree) contact and support at the associated surface(s).

The wheel disc 20 is supported in the assembly tooling apparatus 100 by a lower wheel disc center support tooling member 120, an upper wheel disc center support tooling member, indicated generally at 122, a wheel disc outer flange support tooling member 124, and a fixed center pilot plug 126. The lower wheel disc center support tooling member 120 is operatively connected to an associated wheel disc lift cylinder C2 via a wheel disc lift piston rod 130. The piston rod 130 extends upwardly through an opening 102A provided in the press bed 102 and is connected to the lower wheel disc center support tooling member 120 by suitable means, such as for example, by a threaded connection. The lower wheel disc center support tooling member 120 is selectively moveable by the piston rod 130 in the direction of the double headed arrow X1. The wheel disc lift cylinder C2 is actuated by suitable means, such as by hydraulic, pneumatic, or other suitable means.

The upper wheel disc center support tooling member 122 includes a gear means, indicated generally at 132, a threaded shaft 134, a movable adjustment member 136, and a stub shaft 142. The adjustment member 136 is operatively connected to the gear means 132 via the threaded shaft 134, and the gear means 132 is operatively connected to a motor means 140. In the illustrated embodiment, the adjustment member 136 has a generally conical shaped outer surface. The adjustment member 136 is connected to the fixed center pilot plug 126 via the stub shaft 142. The opposed ends of the stub shaft 142 are connected to the adjustment member 136 and the center pilot plug 126 by suitable means. The center pilot plug 126 defines an outer diameter which is slightly less than an inner diameter defined by the center pilot hole 22A of the wheel disc 20 so as to be received therein in a,slight interference fit therewith. As will be discussed below, the adjustment member 136 is selectively moveable via the shaft 134 in the direction of the double headed arrow X2. Alternatively, the upper wheel disc center support tooling member 122 can be selectively moveable by other means, such as for example, by hydraulic, pneumatic, or other suitable means.

In the illustrated embodiment, there are four wheel disc outer flange support tooling members 124 (only two of such tooling member 124 being illustrated in FIGS. 1–4) each including a separate outer annular tooling member 150 operatively connected thereto by suitable means for movement in the direction of the double headed arrow X3.

In the illustrated embodiment, cylinders C3 are provided for moving the tooling members 150 in the direction of the arrow X3. Each of the tooling members 150 includes an end surface 150A which is effective to engage and support the outer end surface 26C of the flange 26 of the outer annular portion 24 of the wheel disc 20 around the entire periphery thereof. Each of the wheel disc outer flange support tooling members 124 includes an inner surface 152. As will be discussed below, as shown in this embodiment, the inner surface 152 has a profile which preferably is generally complimentary to the outer profile of the adjustment member 136. Alternatively, the profile of the inner surface 152 of the wheel disc outer flange support tooling members 124 and/or the profile of the outer surface of the adjustment member 136 can be other than illustrated if so desired. Each of the wheel disc outer flange support tooling members 124 is moveable in the direction of the double headed arrow Y1 in response to the movement of the adjustment member 136. Each of the tooling members 150 is connected to an associated end of a piston rod 154 in a suitable manner to allow the tooling member 150 to move in the direction of the arrows Y1. As a result of this, as will be discussed below, the tooling member 150 of the upper wheel disc center support tooling member 122 is selectively adjustable relative to the lower wheel disc center support tooling member 120 so that an end surface 150A thereof is operative to engage an end surface 26C of the flange 26 of the wheel disc 20 preferably without the tooling member 150 contacting an adjacent surface of the wheel rim 40 to thereby accommodate for tolerance variations in the flange 26 of the wheel disc 20, in the wheel rim 40, or both. Alternatively, the structure and/or the number of the wheel disc outer flange support tooling members 124 and/or tooling members 150 can be other than illustrated if desired. In the illustrated embodiment, the cylinders C3 are preferably hydraulic fluid actuated cylinders which are supplied with fluid from a valve means, indicated generally at 156. As will be discussed below since hydraulic fluid is incompressible, once the tooling members 150 are in a desired position, the valve means 156 is closed to thereby fix the position of each of the wheel disc outer flange support tooling members 150.

Alternatively, the structure of one or more of the lower wheel disc center support tooling member 120, the upper wheel disc center support tooling member 122, the wheel disc outer flange support tooling member 150, and the center pilot plug 126 can be other than illustrated and described if desired. For example, the lower wheel disc center support tooling member 120, the upper wheel disc center support tooling member 122, and/or the wheel disc outer flange support tooling member 124 can be segmented tooling member(s) (i.e., not uninterrupted continuous tooling member(s) so as not to provide full (i.e., 360 degree) contact and support at the associated surface(s).

Figure 2:
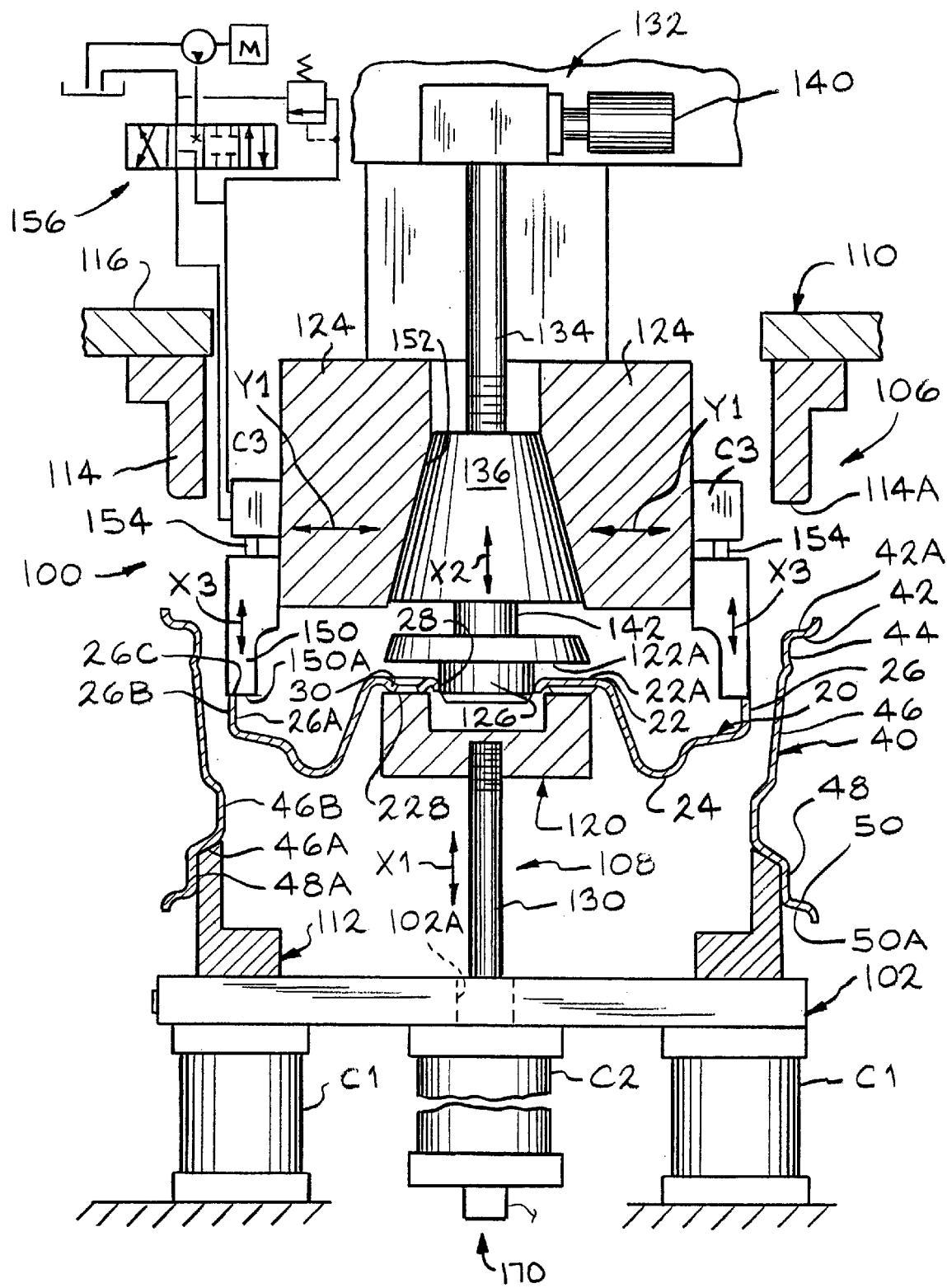
FIG. 2 is a partial sectional view of a wheel assembly tooling apparatus according to this invention, with the wheel assembly tooling apparatus being shown in an intermediate position of the assembly process in accordance with the present invention.
Figure 5:
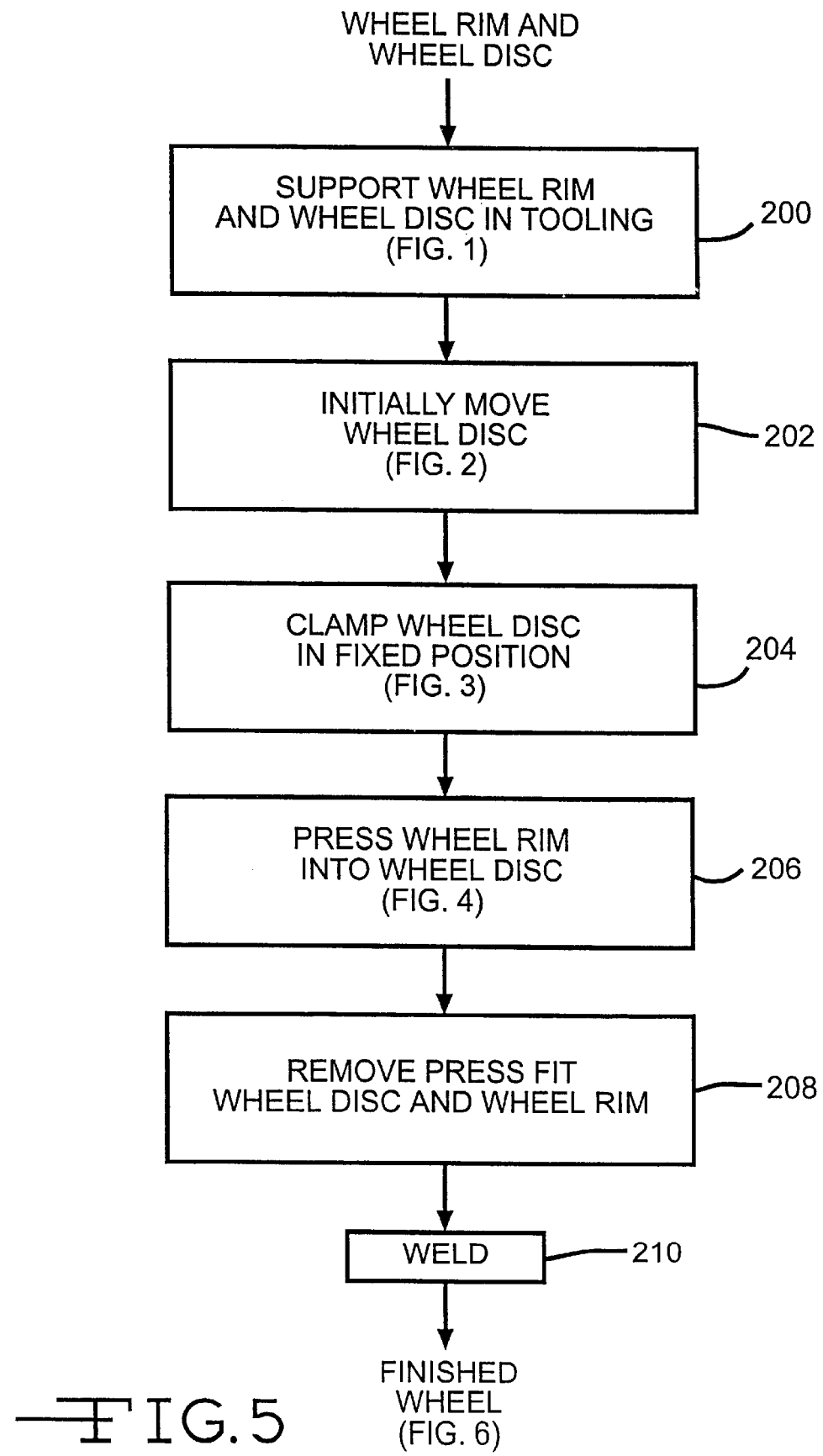
FIG. 5 is a block diagram showing a sequence of steps for producing the vehicle wheel in accordance with the present invention.

Referring now to FIG. 5, a sequence of steps for assembling the wheel disc 20 and the wheel rim 40 together to produce the vehicle wheel 10 of the present invention using the wheel assembly tooling apparatus 100 of this invention will be discussed. Initially, in step 200, the wheel rim 40 and the wheel disc 20 are supported by the assembly tooling apparatus 100 in the position illustrated in FIG. 1. In particular, the wheel rim 40 is engaged and supported on the lower wheel rim tooling support member 112 at the inboard surface 46A of a section of the well 46 around the entire periphery thereof, and the wheel disc 20 is engaged and supported on the lower wheel disc support tooling member 120 at the outboard surface 22B of the inner wheel disc mounting portion 22 around the entire periphery thereof. Next, in step 202, the wheel disc lift cylinder C2 is actuated so as to raise the wheel disc 20 in the direction of the arrow X1 causing the end surface 26C of the flange 26 of the wheel disc 20 to contact the end surface 150A of the wheel disc flange support tooling member 124, as shown in FIG. 2. During step 202, the valve means 156 is in the open position.

Figure 3:
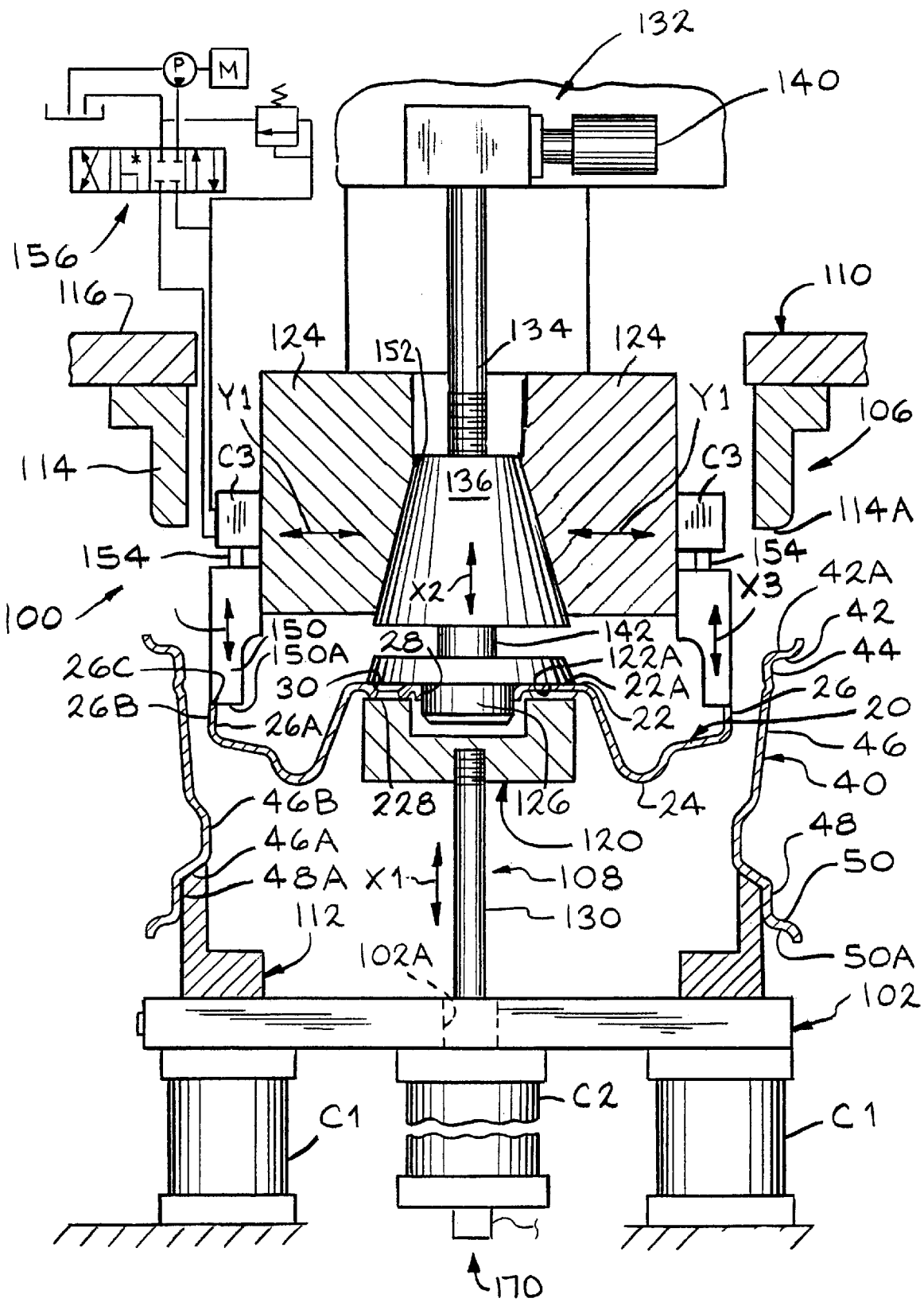
FIG. 3 is a partial sectional view of a wheel assembly tooling apparatus according to this invention, with the wheel assembly tooling apparatus being shown in a further intermediate position of the assembly process in accordance with the present invention.

Following this, in step 204, the wheel disc 20 continues to be raised by the wheel disc lift piston rod 130 until the inner surface 22A of the wheel disc 20 engages a lower fixed surface 122A of the upper wheel disc center support tooling member 122 as shown in FIG. 3. At the same time, since the valve means 156 are in the open position, the wheel disc flange support tooling member 124 and the tooling members 150 move freely upwardly causing the pistons 154 to be moved upwardly into the associated cylinders C3. During such upward movement, a generally continual contact is maintained between the outer end surface 26C of the wheel disc 20 and the associated end surface 150A of each of the tooling members 150. The wheel disc 20 continues to be raised by the wheel disc lift piston rod 130 until a sensor, indicated generally at 170, senses no movement of the wheel disc 20 at which point the wheel disc 20 is firmly clamped between the upper wheel disc center support tooling member 122 and the lower wheel disc center support tooling member 120, as shown in FIG. 3. When this occurs, the tooling members 150 are selectively moveable via the cylinders C3 and piston rod 154 to ensure that the respective end surfaces 150A thereof is in direct contact with the outer end surface 26C of the wheel disc 20. Next, the valve means 156 is closed thereby preventing any further movement of the pistons 154, and therefore, the tooling members 150. Thus, as shown in FIG. 3, the wheel mounting portion 22 of the wheel disc 20 is fixedly clamped between the upper wheel disc center support tooling member 122 and the lower wheel disc center support tooling member 120, and the outer end surface 26C of the flange 24 of the wheel disc 20 is supported and engaged by the outer end surface 150A of the tooling member 150.

Figure 4:
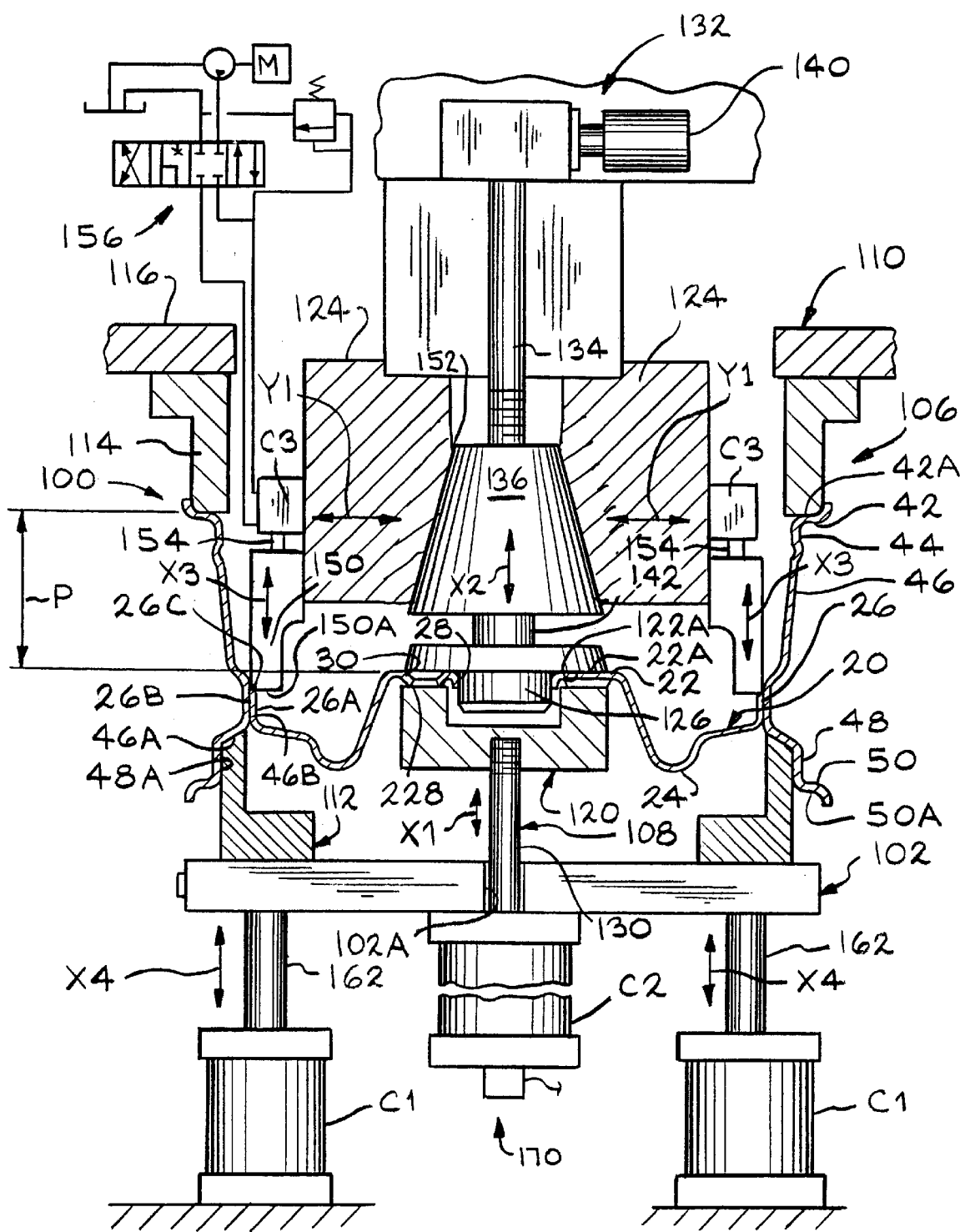
FIG. 4 is a partial sectional view of a wheel assembly tooling apparatus according to this invention, with the wheel assembly tooling apparatus being shown in the final position of the assembly process in accordance with the present invention.

Next, in step 206, the wheel rim lift cylinders C1 are actuated to cause a plurality of associated wheel rim lift piston rods 162 to raise the wheel rim 40 upwardly via the lower wheel rim support tooling member 112 toward the "stationary held" wheel disc 20 in the direction of arrows X4. The wheel rim 40 continues to be raised and pressed in or force fitted over the wheel disc 20 until the inner surface 42A of the inboard tire bead seat retaining flange 42 of the wheel rim 40 engages an outer end surface 114A of the tooling member 114 of the upper wheel rim support tooling member 110, as shown in FIG. 4. As shown therein, the outer end surface 114A of the tooling member 114 is located a predetermined distance P relative to lower surface 122A of the upper wheel disc center support tooling member 122. As a result, as shown in FIG. 6, the inboard mounting surface 22A of the wheel disc 20 is precisely located a predetermined lateral distance L relative to the inner surface 42A of the inboard tire bead seat 42 thereby minimizing the lateral runout in the wheel assembly. In step 208, the cylinders C1 and C2 are actuated to move the respective pistons 162 and 130 downwardly and cause the assembled wheel 10 to be lowered along with the lower wheel rim support tooling member 112 and the lower wheel disc center support tooling member 120. The "press fit" wheel assembly 10 is then removed from the apparatus 100 in step 208, and a weld 60 is provided to permanently join the wheel disc 20 and the wheel rim 40 together during step 210 to thereby produce the vehicle wheel 10. Once the vehicle wheel 10 is removed, the tooling members of the apparatus 100 are returned to the positions shown in FIG. 1 for assembling together another wheel rim and wheel disc.

Alternatively, the assembly of the wheel rim 40 and the wheel disc 20 can be other than illustrated if desired. For example, the wheel rim 40 can be held stationary and the wheel disc 20 moved relative thereto and pressed therein, or both the wheel rim 40 and the wheel disc 20 can be moved relative to one another.

Figure 7:
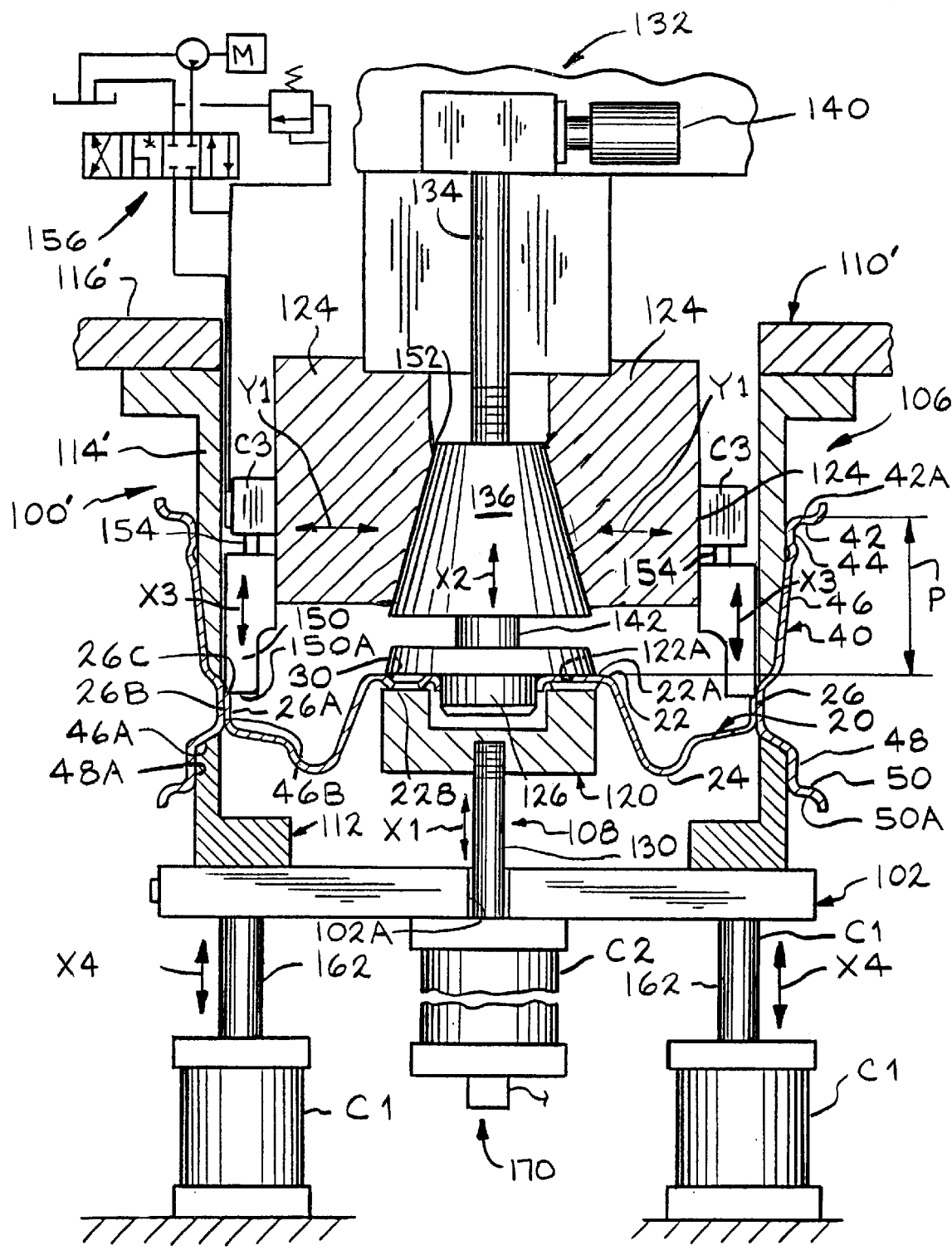
FIG. 7 is a partial sectional view of a second embodiment of a wheel assembly tooling apparatus according to this invention, with the wheel assembly tooling apparatus being shown in the final position of the assembly process in accordance with the present invention.

Turning now to FIG. 7 and using like reference numbers to indicate corresponding parts, there is illustrated a second embodiment of a wheel assembly tooling apparatus, indicated generally at 100', which can be used to assemble a wheel disc 20 and a wheel rim 40 to produce the vehicle wheel 10 of the present invention. The assembly tooling apparatus 100' shown in this embodiment includes a plurality tooling members which are moveable between an intermediate working position (not shown) and a final working position, shown in FIG. 4, wherein the associated tooling members thereof are operative to support the wheel rim 40 at or near sections thereof which are located adjacent the area subjected to frictional forces during the assembling of the wheel disc 20 and the wheel rim 40.

As shown therein, the assembly tooling apparatus 100' is similar to the assembly tooling apparatus 100 shown in FIGS. 1–4 except for the structure of an upper wheel rim support tooling member 110'. As shown in this embodiment, the upper wheel rim support tooling member 110' includes a pair of upper support tooling members 114' and 116' which are connected together by a suitable means (such as for example, by a plurality of bolts (not shown). The tooling members 114' is preferably an uninterrupted continuous annular tooling member. As a result, the an end surface 114A' of the tooling member 114' is operative to engage and support a generally radially outwardly extending inboard surface 46B' of a section of the well 46 of the wheel rim 40 around the entire periphery thereof. Also, there may be some contact between a surface 114B' of the tooling member 114' and a generally axially extending inboard surface 46C' of a section of the well 46 of the wheel rim 40. Alternatively, the tooling member 114" could also engage and support the inboard surface 42A of a section of the well 46 of the wheel rim 40 in a manner similar to that described and illustrated above in connection with FIGS. 1–4.

One advantage of the wheel assembly tooling apparatus 100 and 100' of the present invention is that it is operative to support the associated wheel rim and wheel disc adjacent the areas which are subjected to frictional forces during the press fit assembly process. As a result of this, the wheel assembly tooling apparatus 100 and 100' of the present invention provides accurate positioning and adequate support of the wheel disc relative to the wheel rim during assembly to thereby reduce the lateral runout in the assembled vehicle wheel 10. The lateral runout L being the distance defined between the inboard mounting surface 22A of the wheel disc 20 and the inner surface 42A of the inboard tire bead seat retaining flange 42 of the wheel rim 40.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for assembling a wheel rim and a wheel disc together to produce a vehicle wheel comprising the steps of:

(a) providing a wheel rim defining an axis and including an inboard tire bead seat retaining flange, an inboard tire bead seat, a well portion, an outboard tire bead seat, and an outboard tire bead seat retaining flange, the outboard tire bead seat retaining flange including a generally radially extending first inner surface, the outboard tire bead seat including a generally axially extending second inner surface, the well portion including a generally radially extending third inner surface adjacent the second inner surface, a generally radially extending fourth inner surface, a generally radially extending fifth inner surface, and a generally axially extending sixth inner surface, the third through the sixth inner surfaces of the well portion extending in succession from the outboard tire bead seat to the inboard tire bead seat, the inboard tire bead seat retaining flange including a generally radially extending seventh inner surface;

(b) providing a wheel disc having a generally centrally located iner wheel mounting portion and an outer annular portion which terminates in a generally axially extending outer annular flange including an endmost surface, the inner wheel mounting portion including an inboard mounting surface and an outboard mounting surface;

(c) supporting the wheel rim at least at a portion of the third inner surface and at least at a portion of one of the fifth inner surface and the seventh inner surface;

(d) supporting the wheel disc at the inboard mounting surface and the outboard mounting surface of the inner wheel mounting portion and only at least at a portion of the endmost surface of the outer annular portion of the wheel disc around the periphery thereof;

(e) selectively moving at least one of the wheel rim and the wheel disc toward one another to cause the outer annular flange of the wheel disc to engage the fourth inner surface of the wheel rim in a press fit engagement therewith while supporting the wheel rim and the wheel disc as recited in steps (c) and (d), the wheel rim and the wheel disc being selectively moved to produce a desired lateral runout dimension defined between the inboard mounting surface of the wheel disc and the seventh inner surface of the wheel rim; and (f) subsequent to step (e), welding the wheel disc to the wheel rim to thereby permanently join the wheel rim and the wheel rim and the wheel disc together and produce the vehicle wheel.

2. The method according to claim 1 wherein during step (e) the wheel disc is held in a stationary fixed position and the wheel rim is selectively moved relative thereto.

3. The method according to claim 1 wherein in step (c) the wheel rim is supported at least at a portion of the third inner surface and at least at a portion of the seventh inner surface.

4. The method according to claim 1 wherein in step (c) the wheel rim is supported at least at a portion of the third inner surface and at least at a portion of the fifth inner surface.

5. The method according to claim 1 wherein in step (c) the wheel rim is supported at least at a portion of the third inner surface, at least at a portion of the fifth inner surface, and at least at a portion of the seventh inner surface.

6. The method according to claim 1 wherein step (c) the wheel rim is supported by a wheel rim tooling support station, the wheel rim tooling support station including an upper wheel rim detail tooling member and a lower wheel rim detail tooling member, the upper wheel rim detail tooling member adapted to engage at least a portion of one of the seventh inner surface and the fifth inner surface of the wheel rim, and the lower wheel rim detail tooling member adapted to engage at least a portion of the third inner surface of the wheel rim.

7. The method according to claim 6 wherein the upper wheel rim detail tooling member is selectively moveable and the lower wheel rim detail tooling member is selectively moveable.

8. The method according to claim 1 wherein in step (d) the wheel disc is supported by a wheel disc tooling station, the wheel disc tooling station including a lower wheel disc center support tooling member, an upper wheel disc center support tooling member, at least one wheel disc outer flange support tooling member, and a center pilot plug.

9. The method according to claim 8 wherein the upper wheel disc center support tooling member is selectively moveable relative to the wheel disc outer flange support tooling member.

10. The method according to claim 8 the wheel disc outer flange support tooling member engages and supports at least a portion of the endmost surface of the outer annular portion of the wheel disc around the peripherhy thereof.

11. An apparatus for assembling a wheel rim and a wheel disc together to produce a vehicle wheel, the wheel rim defining an axis and including an inboard tire bead seat retaining flange, an inboard tire bead seat, a well portion, an outboard tire bead seat, and an outboard tire bead seat retaining flange, the outboard tire bead seat retaining flange including a generally radially extending first inner surface, the outboard tire bead seat including a generally axially extending second inner surface, the well portion including a generally radially extending third inner surface adjacent the second inner surface, a generally axially extending fourth inner surface, a generally radially extending fifth inner surface, and a generally axially extending sixth inner surface, the third through the sixth inner surfaces of the well portion extending in succession from the outboard tire bead seat to the inboard tire bead seat, the inboard tire bead seat retaining flange including a generally radially extending seventh inner surface, the wheel disc having a generally centrally located inner wheel mounting portion and an outer annular portion which terminates in a generally axially extending outer annular flange including an endmost surface, the inner wheel mounting portion including an inboard mounting surface and an outboard mounting surface, the apparatus comprising:

a wheel rim support tooling station including an upper wheel rim detail tooling member and a lower wheel rim detail tooling member, said upper wheel rim detail tooling member adapted to engage at least a portion of one of the seventh inner surface and the fifth inner surface of the wheel rim, and said lower wheel rim detail tooling member adapted to engage at least a portion of said third inner surface of the wheel rim; and a wheel disc support tooling station including a lower wheel disc center support tooling member, an upper wheel disc center support tooling member, at least one wheel disc outer flange support tooling member, and a center pilot plug, said upper wheel disc center support tooling member being selectively moveable relative to said wheel disc outer flange support tooling member, said wheel disc outer flange support tooling member operative to engage and support only at least a portion of said endmost surface of said outer annular portion of said wheel disc around the periphery thereof.

* * * * *